United States Patent [19]

Sato

[11] Patent Number: 5,026,175
[45] Date of Patent: Jun. 25, 1991

[54] SHAFT SUPPORTING STRUCTURE

[75] Inventor: Hiroyuki Sato, Tokyo, Japan

[73] Assignee: Seikosha Co., Ltd., Tokyo, Japan

[21] Appl. No.: 442,045

[22] Filed: Nov. 27, 1989

[30] Foreign Application Priority Data

Dec. 9, 1988 [JP] Japan ............................ 63-160247[U]

[51] Int. Cl.$^5$ ........................ F16C 29/00; F16C 35/02; F16B 21/00
[52] U.S. Cl. .................................... 384/29; 384/428; 403/353
[58] Field of Search ..................... 403/254, 353, 348; 384/29, 41, 428, 438, 439, 418, 419, 295, 296

[56] References Cited

U.S. PATENT DOCUMENTS

| | | | |
|---|---|---|---|
| 3,002,792 | 10/1961 | Sekulski | 384/419 |
| 3,053,368 | 9/1962 | Klahn | 384/419 X |
| 3,876,317 | 4/1975 | Jordon | 403/353 X |
| 4,551,117 | 11/1985 | Kunz | 403/353 X |
| 4,637,741 | 1/1987 | Gillet | 403/353 X |

Primary Examiner—Thomas R. Hannon
Attorney, Agent, or Firm—Jordan and Hamburg

[57] ABSTRACT

A shaft supporting structure includes a shaft having longitudinal end portions, with at least one of the end portions having at least one planar surface parallel to the axis of the shaft. A receiver part which receives the one end portion of the shaft has a regulate structure defining a recess through which the one end portion of the shaft can pass when the one end portion is moved in an insertion direction parallel to the planar surface. The regulate structure is operable to restrict radial displacement of the shaft after the shaft has been received in the receiver part and the shaft has been rotated so that the planar surface is no longer parallel to the insertion direction. A resilient pawl is operable to engage the planar surface and restrict rotation of the shaft in the receiver part. According to another embodiment, a receiver member and a cylindrical member have an assembled position in which the cylindrical member is disposed between one end portion of the shaft and the receiver member, the cylindrical member being placed in the assembled position by sliding the cylindrical member axially between the one end portion of the shaft and the receiver member such that the one end portion of the shaft is slidably received in the cylindrical member and the receiver member slidably receives the cylindrical member.

12 Claims, 4 Drawing Sheets

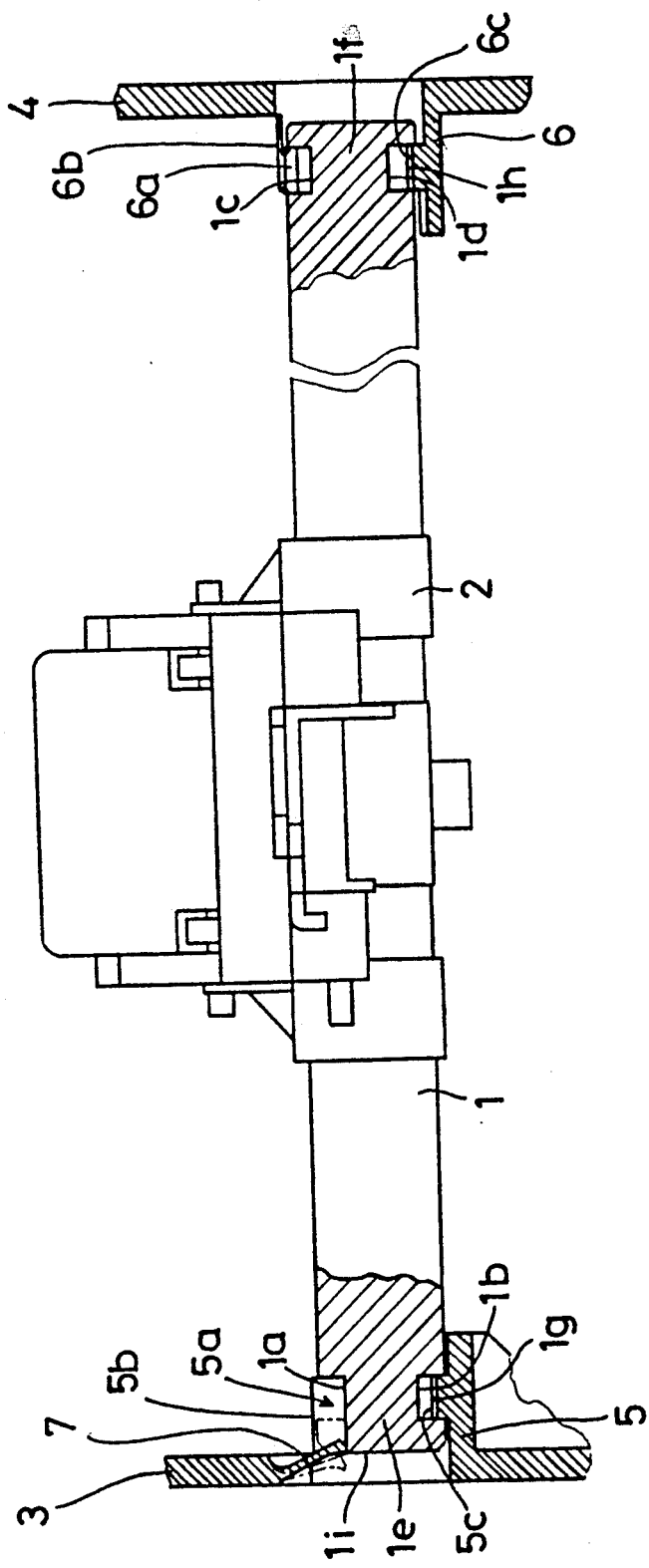

SHAFT SUPPORTING STRUCTURE

BACKGROUND OF THE INVENTION

In printers and the like, heretofore, a guide shaft for guiding a print head was supported by supporting plates in such a manner that bearing holes were provided in the supporting plates, the guide shaft was passed through the bearing holes, and the guide shaft was secured on the outside of the supporting plates by the use of screws or E-shaped retainers.

In such a structure, a screwdriver and screws are needed in effecting assembly, and the task of attaching screws and E-shaped retainers is troublesome such that the efficiency of assembly is impaired.

It is an object of the present invention to eliminate the need for any screwing operation using a screwdriver and to eliminate having to attach E-shaped retainers using a pair of pliers, thereby improving the efficiency of assembly.

SUMMARY OF THE INVENTION

To achieve the foregoing objects, according to a first embodiment of the present invention, a shaft supporting structure comprises a shaft having at each of its end portions a recess section including planar surfaces parallel to the axis thereof, and having receiver portions projecting inward from a pair of supporting members for rotatably supporting both end portions of the shaft. The receiver portion has two regulate portions between which the recess portion can pass only in a direction parallel to the planar surfaces and orthogonal to the axial line, and an engaging portion engageable with the shaft to restrict the axial movement of the shaft. At least one of the supporting members has a resilient pawl engageable with the planar surface of the recess portion. After the recess portions are passed between the regulate portions and the shaft is supported by the receiver portions, the regulate portions come into engagement with the recess portions by rotating the shaft, thereby restricting the radial movement of the shaft. The resilient pawl is pushed in opposition to its spring force by an end surface of the shaft when the recess portions are passed between the regulate portions and comes out of engagement with the end surface when the shaft is rotated to come into engagement with the planar surface on the shaft.

Further, a second embodiment of the present invention resides in a shaft supporting structure which comprises a receiver means and a cylindrical means, the cylindrical means having an assembled position in which cylindrical means is disposed between one end portion of said shaft and the receiver means, the receiver means having a recess permitting the one end portion of the shaft to be inserted into the receiver means in an insertion direction generally perpendicular to the shaft axis. The cylindrical means is placed in its assembled position by sliding the cylindrical means axially between the one end portion of the shaft and the receiver means such that the one end portion of the shaft is slidably received in the cylindrical means and the receiver means slidably receives the cylindrical means.

BRIEF DESCRIPTION OF THE DRAWINGS

FIG. 1 is a front elevational view, partly in cross section, of a shaft support structure according to one embodiment of the invention;

DESCRIPTION OF THE PREFERRED EMBODIMENTS

Figure 2A:
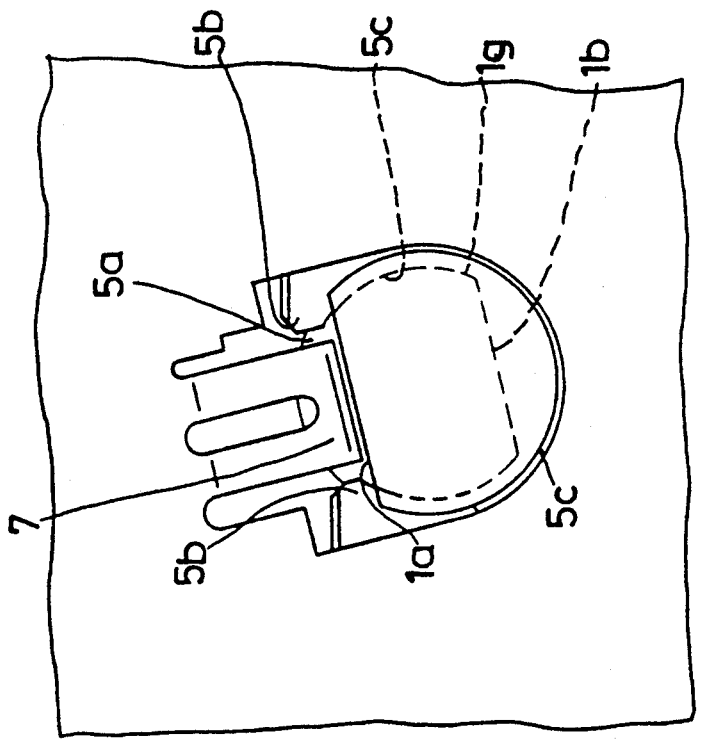
FIG. 2(A) is a left side view of FIG. 1 but on a larger scale.

An embodiment according to a first feature of the present invention will now be described with reference to FIGS. 1, 2(A) and 2(B).

A shaft 1 is a front guide shaft for guiding a carriage 2 on which a print head of a printer is mounted, both end portions of the shaft 1 being rotatably supported by receiver portions 5, 6 projecting from a pair of supporting members 3, 4. Each end portion of the shaft 1 has a recess portion 1e (1f) formed with a pair of opposite planar surfaces 1a and 1b (1c and 1d), and each recess portion 1e (1f) has an engaging groove 1g (1h) formed along the outer periphery thereof.

The receiver portion 5 (6) of each supporting member 3 (4) has a pair of regulate protrusions 5b, 5b (6b, 6b) confronting each other via an opening 5a (6a), which serve as regulate portions for allowing the recess portion 1e (1f) to pass therebetween only in a direction substantially parallel to the planar surfaces 1a, 1b (1c, 1d). Specifically, after the recess portions 1e, 1f are passed through the openings 5a, 6a, both end portions of the shaft 1 are seated in the receiver portions 5, 6, and the shaft 1 is rotated, the regulate protrusions 5b, 5b; 6b, 6b restrict radial movement of the shaft 1 by engaging with the outer surfaces of the recess portions 1e, 1f. Further, the inner surface of each receiver portion 5 (6) has an engaging protrusion 5c (6c) serving as an engaging portion for restricting axial movement of the shaft 1. In the embodiment, each engaging protrusion 5c (6c) is adapted to engage with the corresponding engaging groove 1g (1h).

The supporting member 3 is formed with a resilient pawl 7 whose urging force is exerted toward the opening 5a. That is, when both end portions of the shaft 1 are seated in the receiver portions 5, 6, the resilient pawl 7 is pushed in opposition to its biasing force by an end surface 1i of the shaft 1, thereby allowing the passing of the shaft 1. When the shaft 1 is rotated after being seated in the receiver portion 5, the resilient pawl 7 comes into engagement with one planar surface 1a by virtue of its biasing force as soon as it comes out of engagement with the end surface 1i of the shaft 1, thereby restricting further rotation of the shaft 1.

Figure 2B:
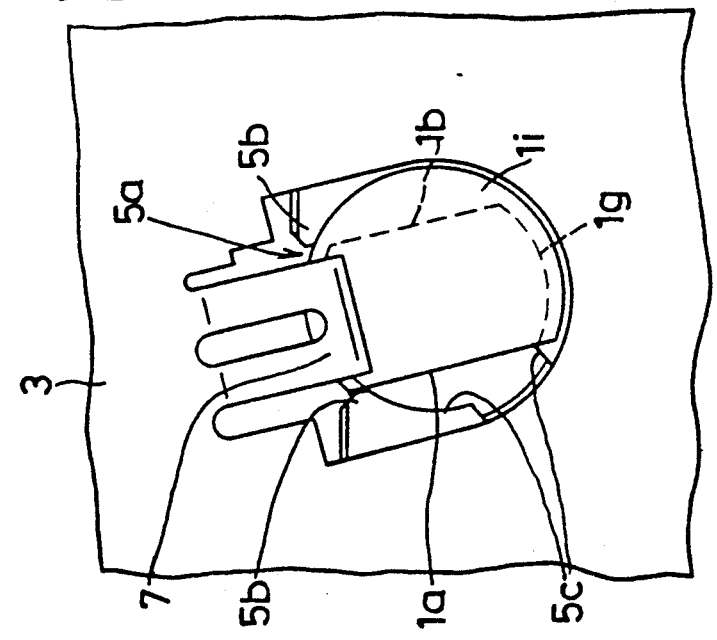
FIG. 2(B) is a view similar to FIG. 2(A) but showing the shaft in a different rotated position.

Because of the foregoing structure, when mounting the shaft 1 to the supporting members 3, 4, as shown in FIG. 2(A), which illustrates one end portion, that is, the left end portion, the recess portions 1e, 1f are inserted in a direction substantially parallel to the planar surfaces 1a, 1b and to the planar surfaces 1c, 1d such that they are passed through the openings 5a, 6a and supported by the receiver portions 5, 6. Then, the shaft 1 is rotated inside the receiver portions 5, 6. As a result as shown in FIG. 2(B), the resilient pawl 7 comes into engagement with the planar surface 1a, so that the shaft 1 can no longer rotate. At the same time, the radial movement of the shaft is restricted by the regulate protrusions 5b, 5b; 6b, 6b, and since the engaging protrusions 5c, 6c come into engagement with the engaging grooves 1g, 1h, the axial movement of the shaft is also restricted, whereby the shaft 1 is stably retained.

Although the previously described embodiment has a pair of opposite planar surfaces 1a, 1b (1c, 1d) in each recess portion 1e (1f), each recess portion may have only one planar surface. Although each supporting member 3 (4) has a pair of regulate protrusions, only one regulate protrusion may be provided on each supporting member.

A second embodiment according to the present invention will now be described with reference to FIGS. 3 to 5.

A shaft 10 is a rear guide shaft for guiding a carriage 2 on which a print head of a printer is mounted, both end portions of this shaft 10 being supported by a pair of supporting members 3, 4. Neck portions 10a, 10b are formed at both end portions of the shaft 10.

The supporting members 3, 4 have cylindrical receiver portions 11, 12 larger in diameter than the neck portions 10a, 10b, these receiver portions being formed with openings 11a, 12a in which the neck portions 10a, 10b can be inserted in a radial direction. Cylindrical members 13, 14 are slidable into the receiver portions 11, 12 in an axial direction, and the neck portions 10a, 10b are received in these cylindrical members.

Specifically, the cylindrical members 13, 14 are rotatably mounted in the receiver portions 11, 12, but relatively non-rotatably receive the neck portions 10a, 10b. That is, as shown in FIG. 4, the neck portion 10a is formed with a planar surface 10c so that it cannot rotate in relation to the cylindrical member 13.

The center of rotation of the cylindrical members 13, 14 is eccentric to that of the guide shaft 10. That is, regarding the left receiver portion 11 in FIG. 3, the cylindrical member 13 rotates while the outer surface of its base portion 13a is in contact with the inner surface of the receiver portion 11, and a distal end portion 13b of the cylindrical member 13 is made eccentric to the base portion 13a. Thus, the center of rotation of the neck portion 10a disposed in the distal end portion 13b is eccentric to that of the cylindrical member 13. Therefore, even when the neck portion 10a is formed concentric with the guide shaft 10, the center of rotation of the cylindrical member 13 becomes eccentric to that of the guide shaft 10.

Figure 3:
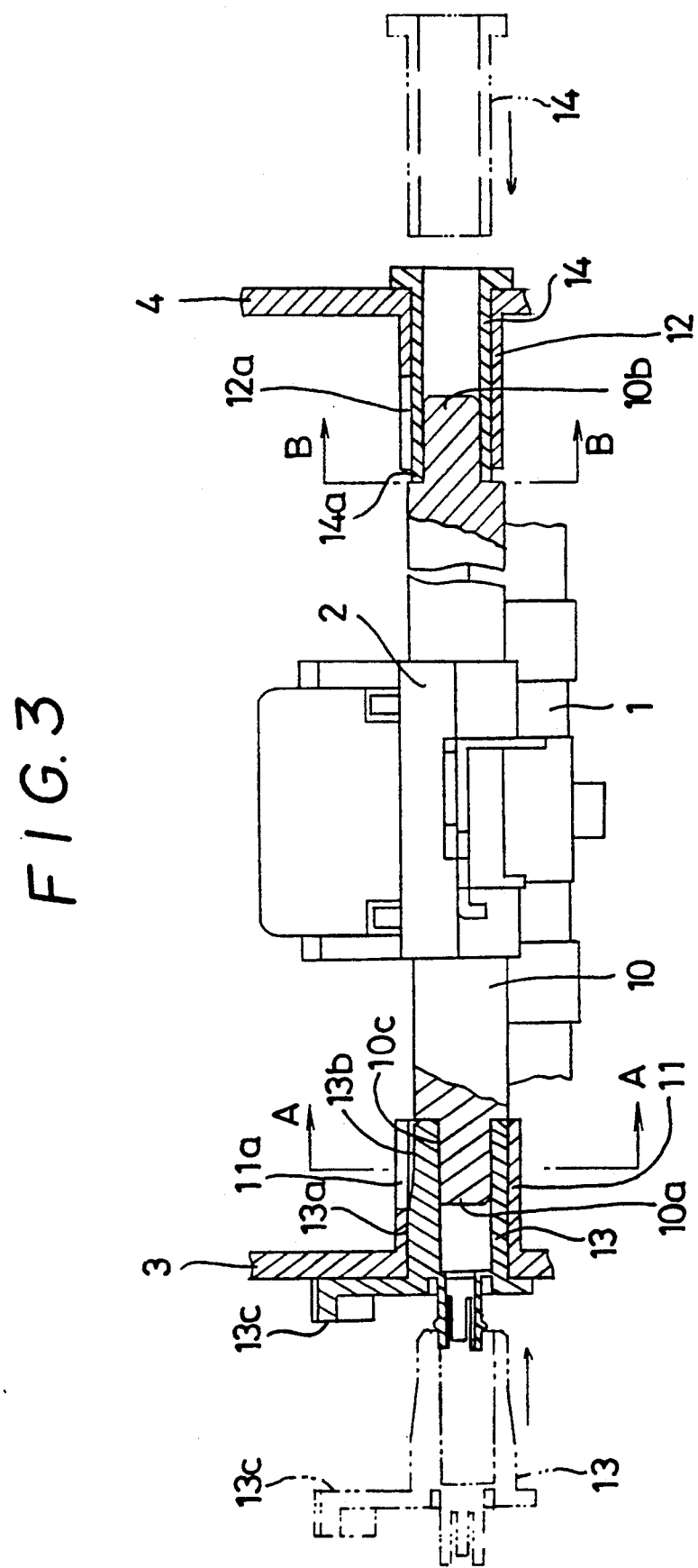
FIG. 3 is an elevational view, partly in cross section, of a shaft support structure according to another embodiment of the invention.
Figure 4:
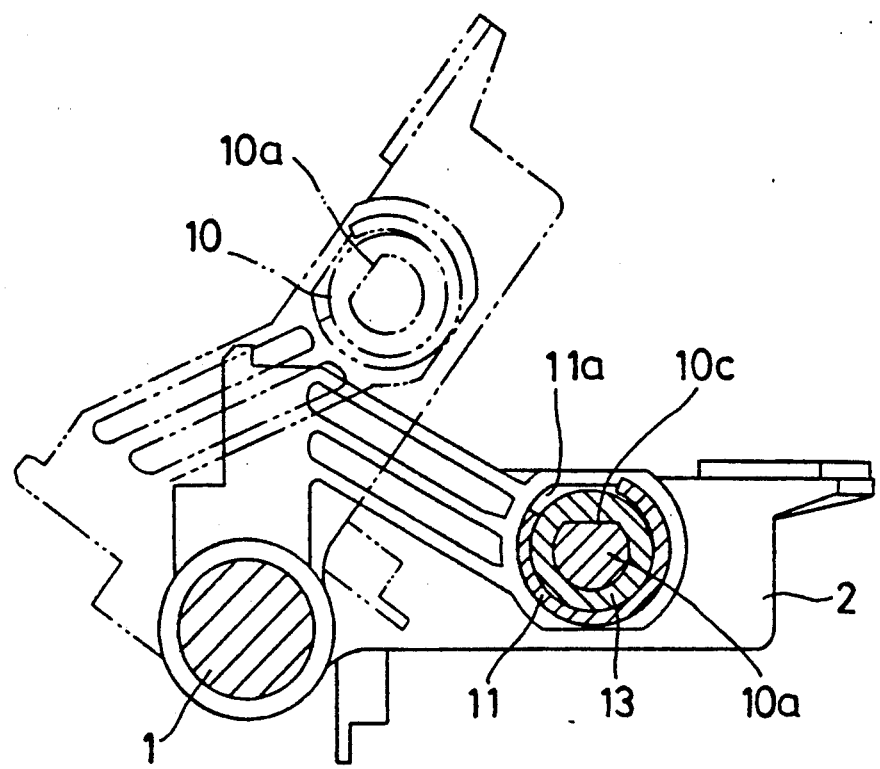
FIG. 4 is a sectional view taken along the line A—A in FIG. 3.

Regarding the right receiver portion 12 in FIG. 3, the neck portion 10b is made eccentric to the guide shaft 10. Thus, the center of rotation of the cylindrical member 14 is eccentric to the guide shaft 10. Therefore, the center of rotation of the guide shaft 10 can be shifted by rotating the cylindrical members 13, 14.

An end of the cylindrical member 13 projecting through the supporting member 3 is integrally formed with a lever portion 13c for rotating of the cylindrical member 13.

Figure 5:
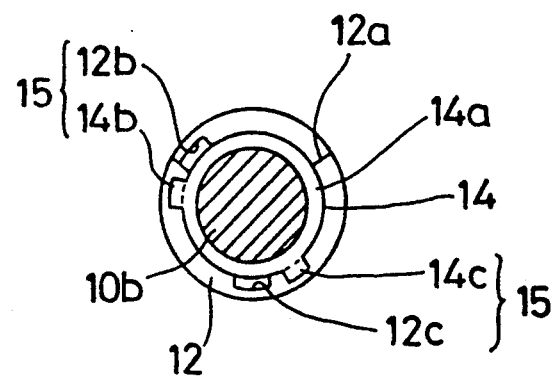
FIG. 5 is a sectional view taken along the line B—B in FIG. 3.

To provide an engaging means 15 for preventing the cylindrical member from coming off of the receiver portion, as shown in FIG. 5, the inner surface of the receiver portion 12 has axial guide grooves 12b, 12c formed therein, and the outer surface of an inner end portion 14a of the cylindrical member 14 has engaging protrusions 14b, 14c capable of passing into the guide grooves 12b, 12c. Therefore, by axially fitting the cylindrical member 14 in the receiver portion 12 such that the engaging protrusions 14b, 14c pass through the guide grooves 12b, 12c, and rotating the cylindrical member 14, the engaging protrusions 14b, 14c come into engagement with the inner end surface of the receiver portion 12, thereby retaining the cylindrical member 14 on the receiver portion 12.

Because of the foregoing structure, the shaft 10 is supported by the supporting members 3, 4 in the following manner. That is, the front guide shaft 1 with the carriage 2 mounted thereon is held by the supporting members 3, 4 as described above, the rear guide shaft 10 is passed through the carriage 2 as shown in FIG. 4, the assembly is swung about the shaft 1 from the chain line position to the solid line position, and the neck portions 10a, 10b of the shaft 10 are radially inserted through the openings 11a, 12a and seated inside the receiver portions 11, 12. Then, the cylindrical member 13 is axially fitted in the receiver portion 11 from outside the supporting member 3 so that the neck portion 10a is non-rotatably fitted in place. Then, the engaging protrusions 14b, 14c are aligned with the guide grooves 12b, 12c, and the cylindrical member 14 is axially fitted in the receiver portion 12 from outside the supporting member 4 so that it is fitted with the neck portion 10b. After being sufficiently pushed in, the cylindrical member 14 is rotated so that the engaging protrusions 14b, 14c come into engagement with the inner end surface of the receiver portion 12.

In this way, both the shaft 1 and the shaft 10 can be securely attached without requiring the use of a screwdriver and without requiring screwing of any parts.

When the lever portion 13c of the cylindrical member 13 is rotated, the shaft 10 is rotated in response to the rotation of the cylindrical member 13. Since the two components are eccentric in terms of the center of rotation, such rotation can delicately shift the center of rotation of the shaft 10 forward, backward, upward and downward, whereby the spacing between the print head and the non-illustrated platen can be adjusted.

In the shaft supporting structure of the present invention, there is no need for a screwdriver, screwing operation and attaching operation of E-shaped retainers, and the only assembly work required is to insert the guide shaft from above and rotate it or to fit the cylindrical members after insertion of the guide shaft. Accordingly, the efficiency of assembly operation can be remarkably improved.

Although the present invention has been described through specific terms, it should be noted here that the described embodiments are not necessarily exclusive and that various changes and modifications may be imparted thereto without departing from the scope of the invention, which is limited solely by the appended claims.

What is claimed is:

1. A shaft supporting structure comprising a shaft having a longitudinal axis and longitudinal end portions, support means supporting said longitudinal end portions of said shaft, at least one of said end portions of said shaft having at least one planar surface parallel to said axis, said support means comprising a receiver means for receiving said one end portion of said shaft, said receiver means having regulate means defining a recess through which said one end portion of said shaft can pass when said one end portion is moved in an insertion direction parallel to said planar surface, said regulate means being operable to restrict radial displacement of said shaft after said shaft has been received in said receiver means and said shaft has been rotated so that said planar surface is no longer parallel to said insertion direction, said support means having a resilient pawl operable to engage said planar surface and restrict rotation of said shaft in said receiver means.

2. A shaft supporting structure according to claim 1, wherein said resilient pawl has a retaining position which extends beyond one longitudinal end of said shaft to engage said planar surface and restrict rotation of said shaft in said receiver means, said resilient pawl being engaged by the longitudinal end of said shaft while said shaft is moved in said insertion direction to temporarily move said resilient pawl from said retaining position to a temporary position to enable said shaft to be inserted in said receiving means, said resilient pawl returning to said retaining position in contact with said planar surface after said shaft has been received in said receiver means.

3. A shaft supporting structure according to claim 1, wherein said support means has an opening generally aligned with said shaft, said resilient pawl extending generally inwardly of said opening.

4. A shaft supporting structure according to claim 3, wherein said resilient pawl is disposed within said opening when said resilient pawl is in said temporary position, said resilient pawl extending outwardly of said opening to engage said planar surface of said shaft when said resilient pawl is in said retaining position.

5. A shaft supporting structure according to claim 1, wherein said support means has a support member having a wall juxtaposed to the longitudinal end of said shaft, said wall being generally perpendicular to the axis of said shaft, said resilient pawl having a natural and unbiased position which extends outwardly of said wall.

6. A shaft supporting structure according to claim 1, wherein said support means comprises a support member generally perpendicular to said axis of said shaft, said resilient pawl being integral with said support member.

7. A shaft supporting structure according to claim 1, wherein the dimension of said shaft along a diametrical line extending to said planar surface is substantially equal to the width of said recess.

8. A shaft supporting structure according to claim 1, wherein said receiver means has protrusion means and said one end portion of said shaft has groove means receiving said protrusion means to restrict axial movement of said shaft.

9. A shaft supporting structure according to claim 1, wherein said one end portion of said shaft has a second planar surface parallel to the first said planar surface, said recess having a width substantially equal to the distance between said two planar surfaces.

10. A shaft supporting structure according to claim 1, wherein the other end portion of said shaft has another planar surface parallel to said axis, said support means further comprising another receiver means for receiving said other end portion of said shaft, said other receiver means having another regulate means defining another recess through which said other end portion of said shaft can pass when said other end portion is moved in said insertion direction, said other planar surface being parallel to said insertion direction, said other regulate means being operable to restrict radial movement of said shaft after said shaft has been received in said other receiver means and said shaft has been rotated so that said other planar surface is no longer parallel to said insertion direction.

11. A shaft supporting structure according to claim 10, wherein said other receiver means has protrusion means and said other end portion of said shaft has groove means receiving said protrusion means to thereby restrict axial movement of said shaft.

12. A shaft supporting structure according to claim 10, wherein said other end portion of said shaft has a further planar surface parallel to said other planar surface, said other recess having a width substantially equal to the distance between said other and said further planar surfaces.

* * * * *